(12) United States Patent
Tice

(10) Patent No.: US 11,267,113 B1
(45) Date of Patent: Mar. 8, 2022

(54) HEAVY DUTY BEARING RACE REMOVER

(71) Applicant: Clay Brian Tice, Stow, OH (US)

(72) Inventor: Clay Brian Tice, Stow, OH (US)

(*) Notice: Subject to any disclaimer, the term of this patent is extended or adjusted under 35 U.S.C. 154(b) by 306 days.

(21) Appl. No.: 16/521,819

(22) Filed: Jul. 25, 2019

(51) Int. Cl.
*B25B 27/06* (2006.01)
*F16C 33/64* (2006.01)

(52) U.S. Cl.
CPC ............ *B25B 27/062* (2013.01); *F16C 33/64* (2013.01); *Y10T 29/53104* (2015.01); *Y10T 29/53857* (2015.01); *Y10T 29/53987* (2015.01)

(58) Field of Classification Search
CPC ............. B25B 27/062; Y10T 29/53104; Y10T 29/53848; Y10T 29/53857; Y10T 29/53987
See application file for complete search history.

(56) References Cited

U.S. PATENT DOCUMENTS

| | | | |
|---|---|---|---|
| 6,755,101 B1* | 6/2004 | Waring | B23B 5/162 408/79 |
| 8,316,530 B2* | 11/2012 | Rode | B25B 27/062 29/724 |
| 10,393,184 B2* | 8/2019 | Wallman | F16C 41/00 |
| 2015/0190912 A1* | 7/2015 | Liu | B25B 27/06 29/275 |
| 2016/0236336 A1* | 8/2016 | Huang | B25B 27/023 |
| 2017/0072547 A1* | 3/2017 | Miller | B25B 27/023 |
| 2018/0156071 A1* | 6/2018 | Mogle, II | F23R 3/44 |
| 2019/0224822 A1* | 7/2019 | Yang | B25B 27/062 |

* cited by examiner

*Primary Examiner* — Sarang Afzali
(74) *Attorney, Agent, or Firm* — Gugliotta & Gugliotta LPA

(57) ABSTRACT

A bearing race remover is provided that can be utilized in the removal of bearing race elements of bearing assemblies of vehicles of Class 1 through Class 8 designations. The bearing race remover is formed of a puller base, a compression member, and a bearing race engagement extension. The puller base has a cylindrical hub having radially disposed vanes forming an engagement collar to contact impinge against a wheel hub. The radially disposed vanes are to engage race engagement protuberances in a self centering manner to engage within the bearing race. Downward or upward movement of the compression member imparts a removal or insertion force onto a bearing race in order to release or reinsert the bearing race into the wheel hub.

8 Claims, 6 Drawing Sheets

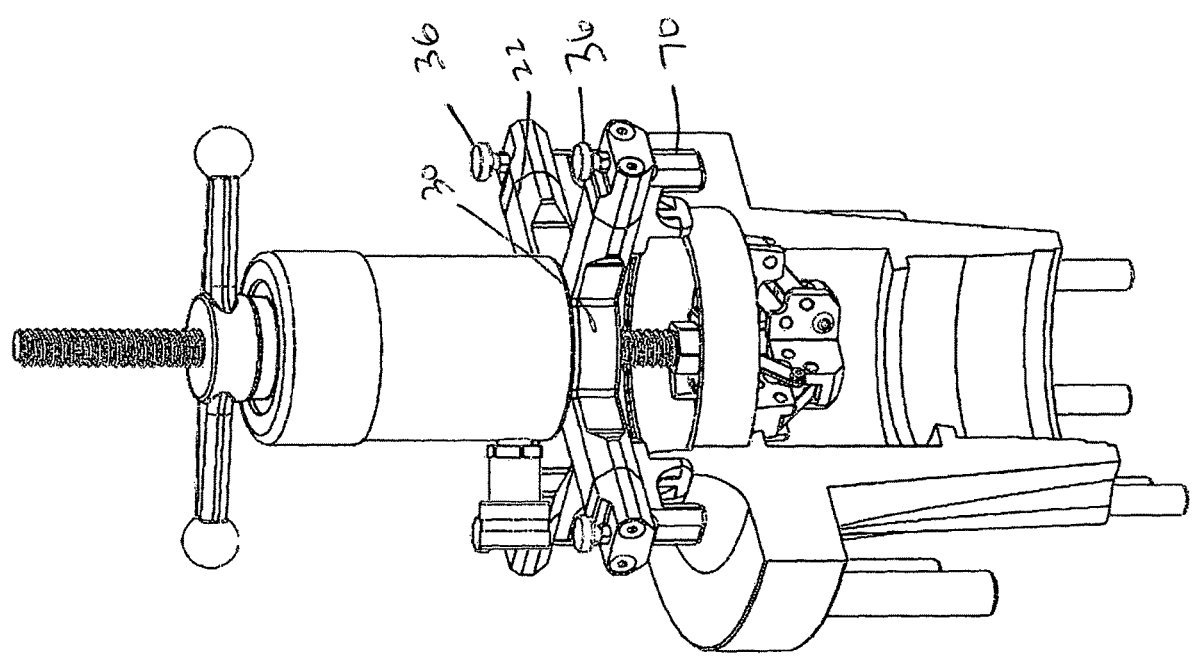

HEAVY DUTY BEARING RACE REMOVER

RELATED APPLICATIONS

There present invention is a continuation in part of U.S. Ser. No. 14/998,353, filed on Dec. 28, 2015, and incorporated by reference as if fully rewritten herein.

BACKGROUND OF THE INVENTION

1. Field of the Invention

The present invention relates to a system and method for removing and/or replacing bearings and, more particularly, to a heavy duty bearing race removal device adaptable to use with truck wheel hubs of multiple classes.

2. Description of the Related Art

In the United States, commercial truck classification is determined based on the vehicle's gross vehicle weight rating (GVWR). The classes range from 1-8, with classes 1-3 defined as light duty, classes 4-6 defined as medium duty, and classes 7-8 defined as heavy duty.

The Class 1 truck GVWR ranges from 0-6000 lb (0-2722 kg). Examples of trucks in this class are pickup trucks include the Toyota Tacoma, Dodge Dakota, Chevrolet Silverado or Ford F-150.

The Class 2 truck GVWR ranges from 6001-10000 lb (2722-4536 kg). [2] Examples of vehicles in this class include the Dodge Ram 2500, Chevrolet Silverado 2500, and the F-250. Class 2 is subdivided into Class 2a and Class 2b, with class 2a being 6001-8500 lb (2722-3856 kg), and class 2b being 8501-10000 lb (3856-4536 kg). Class 2a is commonly referred to as a light duty truck, with class 2b being the lowest heavy-duty class, also called the light heavy-duty class.

The Class 3 truck GVWR ranges from 10001-14000 lb (4536-6350 kg). Examples of vehicles in this class include the Dodge Ram 3500, Ford E-350, Ford F-350, and the GMC Sierra 3500. The Hummer H1 is another example of a single rear wheel Class 3 truck, with a GVWR of 10300 lb (4672 kg).

The Class 4 truck GVWR ranges from 14001-16000 lb (6351-7257 kg). Examples of vehicles in this class include the Ford E-450, Ford F-450, Dodge Ram 4500, and the GMC 4500.

The Class 5 truck GVWR ranges from 16001-19500 lb (7258-8845 kg). Examples of trucks in this class include the International TerraStar, GMC 5500, Dodge Ram 5500, and the Ford F-550

The Class 6 truck GVWR ranges from 19501-26000 lb (8846-11793 kg). Examples of trucks in this class include the International Durastar, Chevrolet Kodiak/GMC TopKick C6500m and the Ford F-650.

Heavy duty vehicles in Class 7 and above require a Class-B commercial driver's license (CDL) to operate in the United States. These include GMC C7500 and the Ford F-750. Their GVWR ranges from 26001-33000 lb (11794-14969 kg). The Class 8 truck GVWR exceeds 33000 lb (14969 kg). These include GMC C8500 trucks as well as most tractor trailer tractors, such as the Freightliner Cascadia for example, as well as single-unit dump trucks of a GVWR over 33,000 lb. Such trucks typically have 3 or more axles. The typical 5-axle tractor-trailer combination, also called a "semi" or "18-wheeler", is a Class 8 vehicle. Standard trailers vary in length from 8' containers to 57' van trailers, with the most common length being the 53' trailer. Specialized trailers for oversized loads can be considerably longer. Commercial operation of a Class 8 vehicle in the United States requires either a Class-B CDL for non-combination vehicles, or a Class-A CDL for combination vehicles (tractor-trailers).

While various in these vehicle exist due to obvious difference in requirement and function, they all utilize a generally similar suspension schema in which the axle(s) have a wheel hub disposed on each end which rotatably supports the wheels and a bearing assembly used to support rotational movement of the wheels. These bearing assemblies are subjected to severe stresses. As such the bearing rollers eventually wear out or are otherwise destroyed and require replacement of the bearing assembly.

In heavier duty trucks, the heavier loads and greater number of miles can result in replacement the bearing assemblies being a frequent and regular event. During replacement, for the part of the bearing that remains on the shaft, a "bearing puller" may be used to remove such a part. For lighter duty trucks such "bearing puller" tools are known. The other part of the bearing, termed the "race", is held within the opening of a wheel hub or other support structure. In some instances, the race can be removed by simply hammering on the race with a cylindrical object to push the race through the opening in the wheel hub structure. Often, this procedure cannot be carried out because when doing so, the damaged race cannot be easily accessed and retrieved from the plate structure. Also, some bearings are housed in wheel hub structures where the race must be inserted and removed only from the frontal side of the plate structure.

It can be seen from the foregoing that a need exists for a tool that may facilitate the removal of a bearing race from the opening in the wheel hub. Further, such a need exists for use with any of these classes of vehicles interchangeably.

Further, to replace the worn parts, it is first necessary to remove the bearing assembly. Additionally, the replacement of a new bearing race may subsequently be required.

It is preferable that a bearing race tool be capable of being adapted to various bearing assemblies used in many different types and classes of vehicles. Such a bearing race tool should extract a bearing race from a wheel hub in an even, linear manner without the use of hammers and punches that may result in damage to the race or wheel hub. Further, a bearing race tool may be used to either remove a bearing race from a wheel hub, or aid in its reinstallation.

Consequently, a need has been felt for providing an adaptable heavy duty bearing race removal and installation device.

SUMMARY OF THE INVENTION

It is thus an object of the present invention to provide a device for and method of extracting a bearing assembly race from a vehicle wheel hub.

It is a further object of the present invention to provide a device for an method of reinserting a bearing assembly race into a vehicle wheel hub.

The present invention provides a bearing race remover that can be utilized in the removal of bearing race elements of bearing assemblies of vehicles of Class 1 through Class 8 designations. The bearing race remover is formed of a puller base, a compression member, and a bearing race engagement extension. The puller base has a cylindrical hub having radially disposed vanes forming an engagement collar to contact impinge against a wheel hub. The radially disposed vanes are to engage race engagement protuberances in a self centering manner to engage within the bearing race. Downward or upward movement of the compression member imparts a removal or insertion force onto a bearing race in order to release or reinsert the bearing race into the wheel hub.

An advantage of the present invention is that it aids in the extracting of a bearing assembly race from a vehicle wheel hub.

Another advantage of the present invention is that is may be adapted for use with various sized wheel hubs and bearing races, such as, for example, any of those vehicles having of Class 1 through Class 8, inclusive.

It is another advantage of the present invention to provide a device that imparts an even, linearly directional extraction force onto a bearing race during removal from a wheel hub.

It is a further advantage of the present invention to be adapted for providing a race insertion force for reinserting a bearing assembly race into a vehicle wheel hub.

Further objects, features, and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6 is a partial detail perspective view of the compression member 14 for use therewith shown in a retracted condition.

DESCRIPTION OF THE PREFERRED EMBODIMENTS

Figure 1:
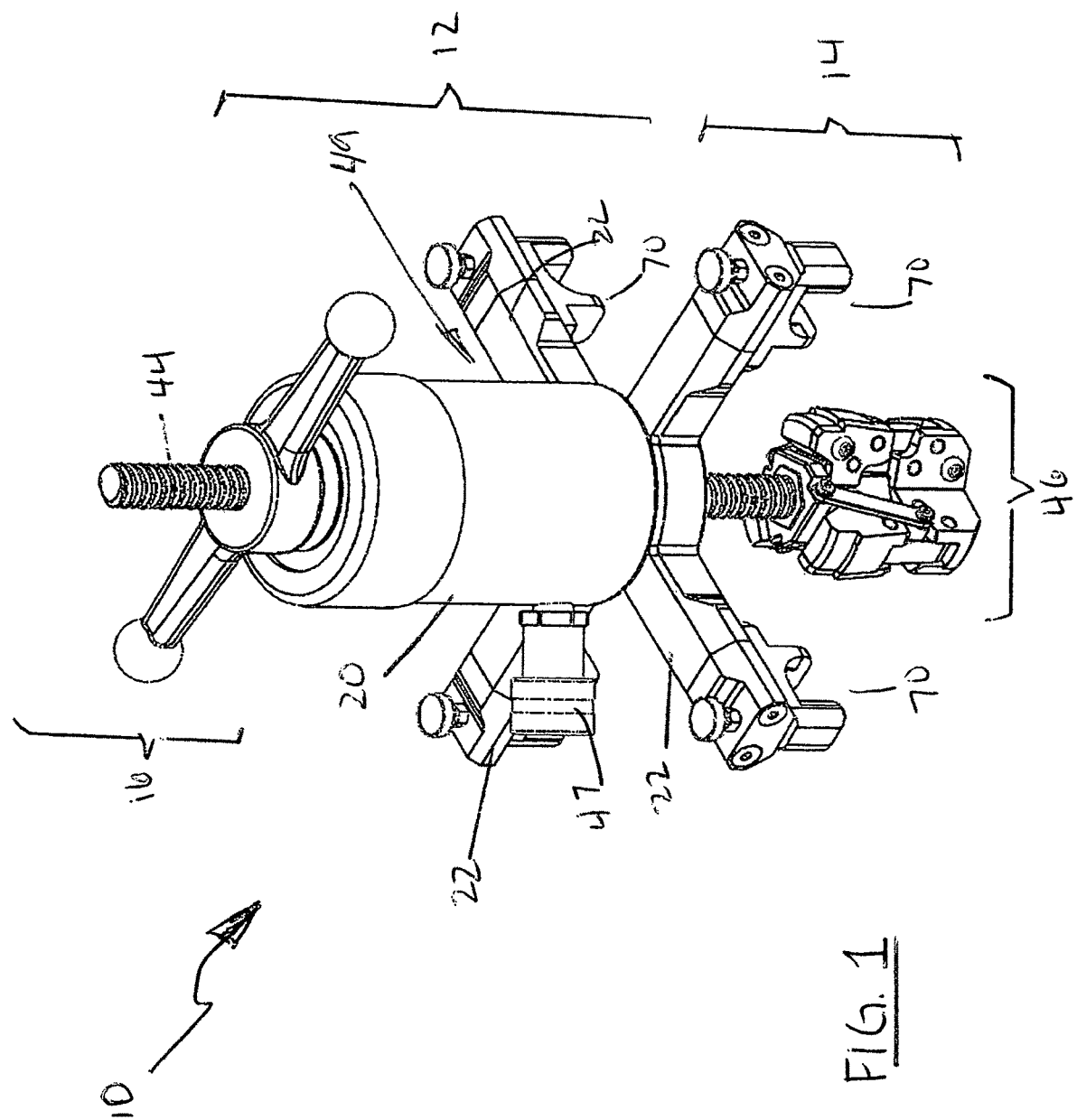
FIG. 1 is a perspective view of a bearing race remover 10 according to a preferred embodiment of the present invention.
Figure 2:
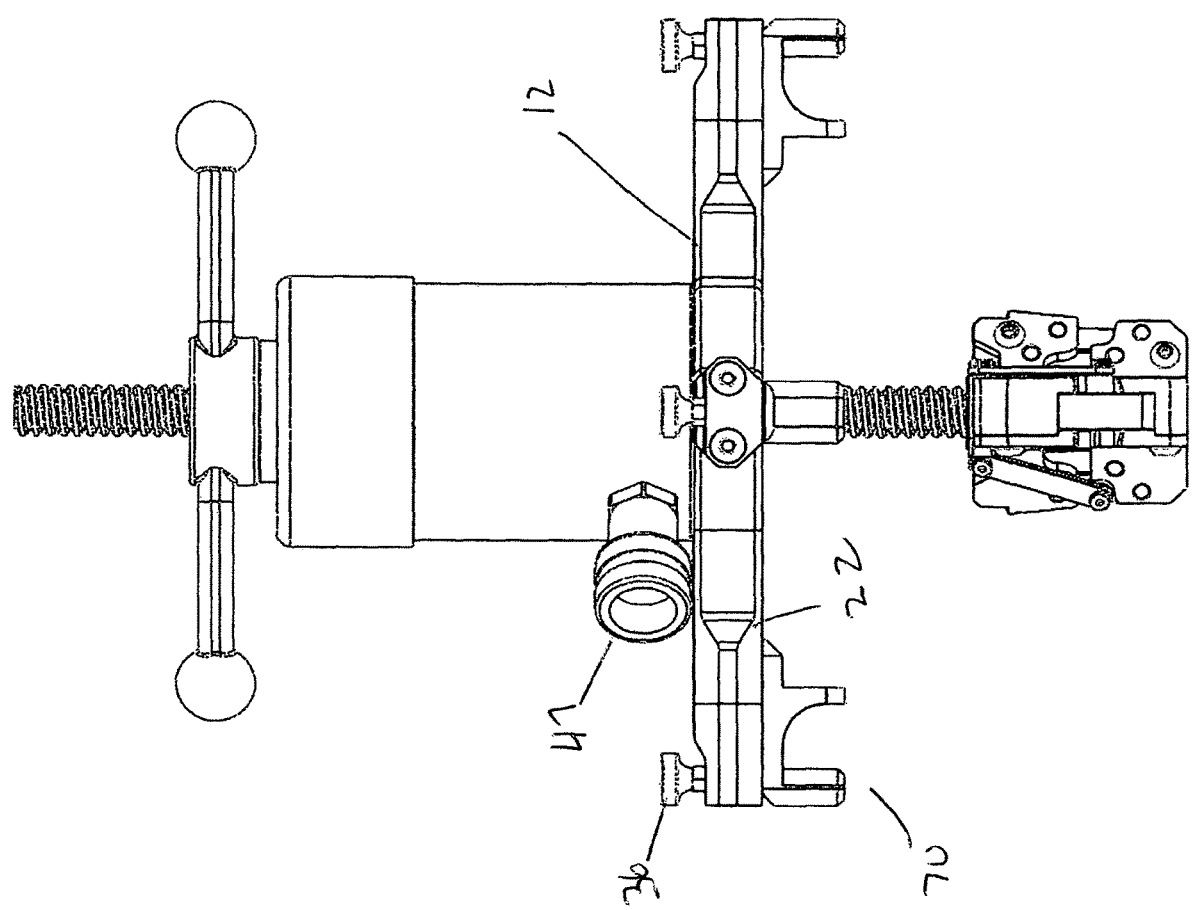
FIG. 2 is a front elevational view thereof.
Figure 3:
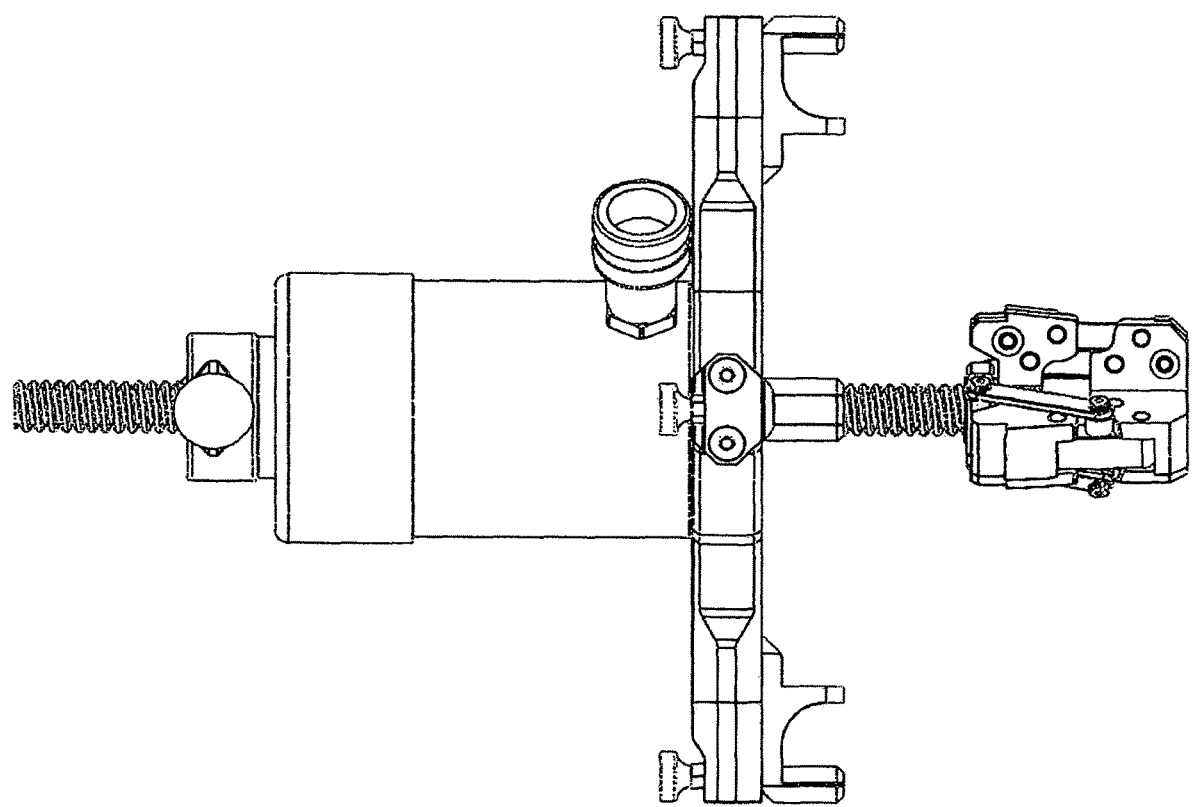
FIG. 3 is a rear elevational view thereof.
Figure 4:
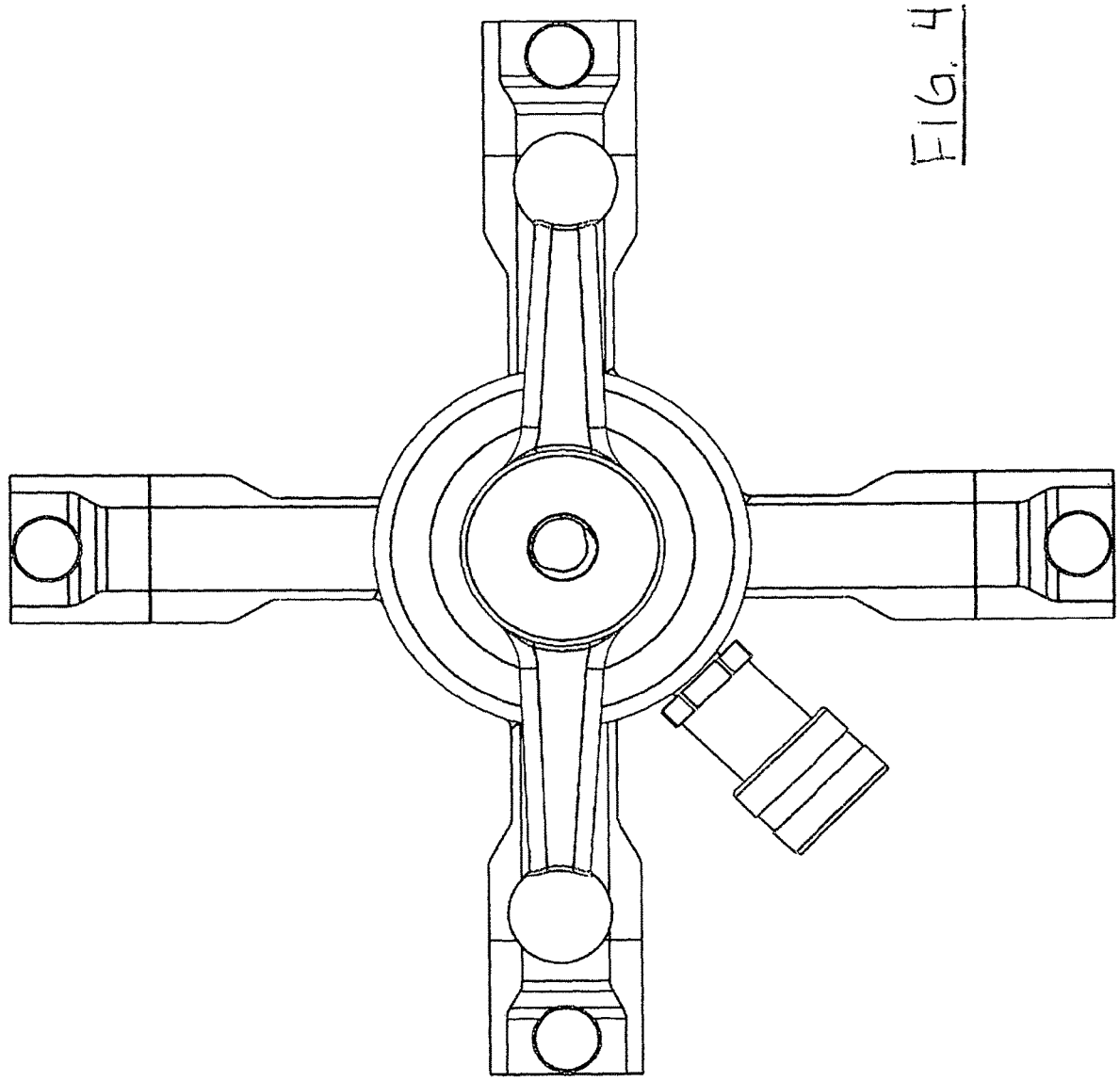
FIG. 4 is a top plan view thereof.
Figure 5:
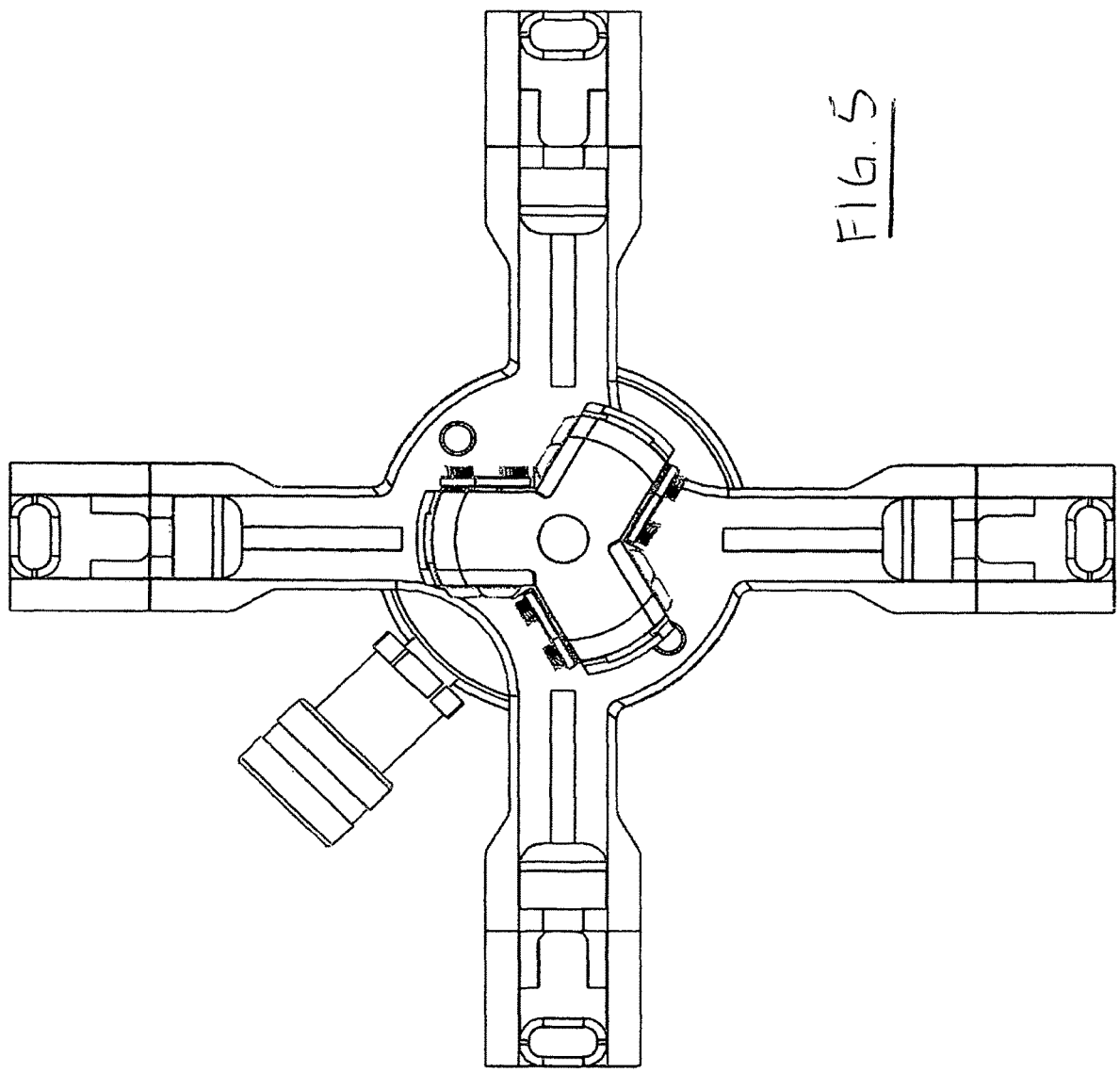
FIG. 5 is a bottom plan view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, a bearing race remover, generally noted as 10, is shown according to the preferred embodiment of the present invention. The bearing race remover 10 is formed of a puller base 12, a compression member 14, and a bearing race engagement extension 16.

The puller base 12 is formed of a generally cylindrical central hub 20 having a plurality of radially disposed vanes 22. The base of the hub 20 and vanes 22 forms a hub engagement collar 30. This collar 30 is to physically contact with and impinge against an upper surface 32 of a wheel hub 40, as will be described in greater detail below. The hub 20 further supports the compression member 14 centrally and in a manner that allows selected linear articulation. Each of the radially disposed vanes 22 are radially adjustable through the use of a sliding engagement stop 36 that is spring urged radially outward. The sliding engagement stops 36 can be pulled inward against the spring so that the number of race engagement protuberances 70 may be placed within and spring urged against wheel hub. The protuberances 70 are thereby self centering via the spring urging force to allow for adaptation to various sized wheel hubs 40 and bearing races 50 such as, for example, any of those vehicles having of Class 1 through Class 8, inclusive. This radial adjustment allows for a series of protuberances 70 to be positioned juxtaposed against an inner surface of the bearing race, as will be described in greater detail below.

Each protuberance 70 is at distal end by an impingement lip 74 adapt for engagement with a race shoulder. Such engagement will allow for transfer of an outward pulling force for release of the race 50 from hub 40.

The compression member 14 is formed of an externally threaded mandrel 42 terminating at an upper end by a rotational shaft 44. The imparting of rotational motion to the shaft 44 causes the mandrel 42 to advance downward or retract upward, respectively, in order to move a plunger 46 that a lower end. While depicted as a direct drive relationship for purposes of clarity, it should be understood that within the range of equivalents of the present invention a planetary gear mechanism, noted generally as 49, may be further included in order to provide improved mechanical advantage in driving the mandrel 42. While the depicted embodiment enables a manually articulated plunger 46 for imparting a removal force onto a bearing race in order to release the race from a vehicle wheel hub, it should be apparent to a person having ordinary skill in the relevant art that such an enablement is merely exemplary, and that a variety of manual or automated mechanisms may be used to advanced and/or retract the plunger 46, such as, inter alia, various hydraulic, pneumatic or electronic drive mechanisms applied to a plunger drive connection 47. As such, such alternate enablements should be considered broadly within the equivalents of the present invention.

In further light of the details as enabled, it is also important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

2. Operation of the Preferred Embodiment

Operation of the preferred embodiment is described in further detail in conjunction with FIGS. 8 through 10 in which a bearing race remover 10 is engaged with a vehicle wheel hub. In such an application, the puller base 14 is inserted within a bearing race 50 within a wheel hub 40. This can be facilitate by radially adjusting the race protuberances 70 outward in order to clear the race inner sidewall. The collar 30 of the puller base 14 is to physically contact with and impinge against an upper surface 32 of a wheel hub 40, at which point the race protuberances 70 may be spring urged outward until the face of the protuberances 74 is engaged with the inner surface of the race 50.

Once so engaged, the compression member 14 is vertically articulated, such as through rotation of a handle, wrench or other drive mechanism to move the mandrel 42 in a first direct, such as a clockwise rotation. Such vertical articulation travels the plunger 42 downward, thereby moving the protuberances 70 until the impingement lip 74 engages with an undercut shoulder of the race. Further articulation applies an evenly distributed separation force which thereby removes the bearing race from within the wheel hub.

Such a smooth, evenly applied force distribution caused mechanical separation of the bearing race without the effort or damage to suspension components that are associated with present methods which rely heavily on the use of a hammer and punch which can both damage the race as well as results in uneven removal forces which may further engage the race unevenly within the hub.

Removal of the puller base 14 from within a bearing race is accomplished by radially adjusting the race protuberances 70 inward in a second direction and traveling the protuberances 70 inward. This is done until the face of the protuberances 70 is disengaged with the inner surface of the race 50.

As shown and described, a person having ordinary skill in the relevant art, in light of the present teachings, would now be enlightened to provide additional functions or adaptations to the described enablement. As such, such modification should be considered within the range of equivalents of the present invention. By way of example, and not meant as a limitation, the downward movement of the compression member to impart a removal force may be adapted to provide an upward movement of the compression member, thereby imparting an insertion force onto a bearing race in order reinsert a bearing race into the wheel hub. Further, other optional accouterments may be added without changing the intended core principals and functions herein. Such options may include, by way of example and not as limitations, the use of support stands or other added functional features, the use of different drive mechanisms, and the like.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar case-law or subsequent precedent should not be made if any future claims are added or amended subsequent to this Patent Application.

What is claimed is:

1. A bearing assembly race remover for removal of bearing race elements of bearing assemblies comprising:
   a puller base adapted to mate in physical contact with and impinge against an upper surface of a wheel hub of vehicles of Class 1 through Class 8 designations wherein said puller base further comprises:
      a generally cylindrical central hub supporting said compression member and having a plurality of outwardly disposed radially disposed vanes; and
      a hub engagement collar formed by a lower surface of said hub and said vanes, said collar adapted to be in physical contact with and impinge against the upper surface of the wheel hub from which a bearing assembly race is to be removed; and
      each of the outwardly disposed radially disposed vanes are radially adjustable through a spring urged articulation of said bearing race engagement extension;
   a compression member centrally supported within said puller base in a manner that allows selected linear articulation; and
   a bearing race engagement extension adapted for insertion within a cylindrical bearing race within the wheel hub and in mechanical connection with said compression member.

2. The bearing assembly race remover of claim 1, comprising:
   said bearing race engagement extension comprise a plurality of outwardly radially directed race engagement protuberances; and
   a radially disposed spring providing an outward spring urging force such as to be self centering between the central hub and a wheel hub and bearing race for those vehicles having of Class 1 through Class 8, inclusive;
   wherein said radial adjustment allows for the protuberances to be positioned juxtaposed against an inner surface of a bearing race.

3. The bearing assembly race remover of claim 2, wherein each protuberance is formed of a linearly elongated tine terminating at distal end by an outward impingement lip adapt for engagement with a race shoulder, whereby such engagement will allow for transfer of an outward pulling force for release of the race from the hub.

4. The bearing assembly race remover of claim 3, wherein said compression member is formed of an externally threaded mandrel terminating at an upper end by a perpendicularly extended rotational first handle such that an imparting of rotational motion to the handle causes the mandrel to advance downward or retract upward, respectively, in order to move a plunger at a lower end.

5. The bearing assembly race remover of claim 4, further comprising a gear mechanism between said handle and said mandrel in order to provide improved mechanical advantage in driving the mandrel.

6. The bearing assembly race remover of claim 1, wherein said compression member is formed of an externally threaded mandrel terminating at an upper end by a rotational first handle such that an imparting of rotational motion to the handle causes the mandrel to advance downward or retract upward, respectively, in order to move a plunger at a lower end.

7. The bearing assembly race remover of claim 6, further comprising a gear mechanism between said handle and said mandrel in order to provide improved mechanical advantage in driving the mandrel.

8. The bearing assembly race remover of claim 6, further comprising an automated drive mechanism in order to drive the mandrel.

\* \* \* \* \*